United States Patent [19]

Watanabe

[11] 4,025,838

[45] May 24, 1977

[54] SIGNAL MODIFICATION DEVICE FOR MEMORY CONTROLLED MANIPULATOR APPARATUS

[75] Inventor: Takehiko Watanabe, Akashi, Japan

[73] Assignee: Kawasaki Heavy Industries, Ltd., Japan

[22] Filed: Dec. 26, 1974

[21] Appl. No.: 536,542

[52] U.S. Cl. .............................................. 318/568
[51] Int. Cl.² ........................................ G05B 19/10
[58] Field of Search ................. 318/562, 568, 569; 340/172.5; 235/151.11

[56] References Cited

UNITED STATES PATENTS

| 3,551,656 | 12/1970 | Wohlfeil | 318/572 |
| 3,757,187 | 9/1973 | Arai | 318/568 |
| 3,770,947 | 11/1973 | Deily | 318/572 |
| 3,825,731 | 7/1974 | Kobayashi et al. | 318/569 |
| 3,889,238 | 6/1975 | Sakurai | 318/569 |

OTHER PUBLICATIONS

"Direct memory access and automatic block transfers", *Minicomputers for Engineers and Scientists*, 7/27/73, McGraw-Hill, pp. 5-17 to 5-23.

Primary Examiner—Robert K. Schaefer
Assistant Examiner—John J. Feldhaus
Attorney, Agent, or Firm—Burgess, Ryan and Wayne

[57] ABSTRACT

The invention discloses a digital position instruction signal modification device for use with a memory controlled manipulator apparatus of the type in which, during a teaching operation, a desired position of manipulator arm means is stored in memory means, and the stored position is read out during repetitive work cycles to cause the manipulator apparatus to reproduce a series of motions taught during the teaching operation. The digital position instruction or command read out from the memory means may be modified by a modifying value entered by a modifying value setting device so that all or desired digital position command or instruction signals stored in the memory means may be modified without repeating the teaching operation.

4 Claims, 7 Drawing Figures

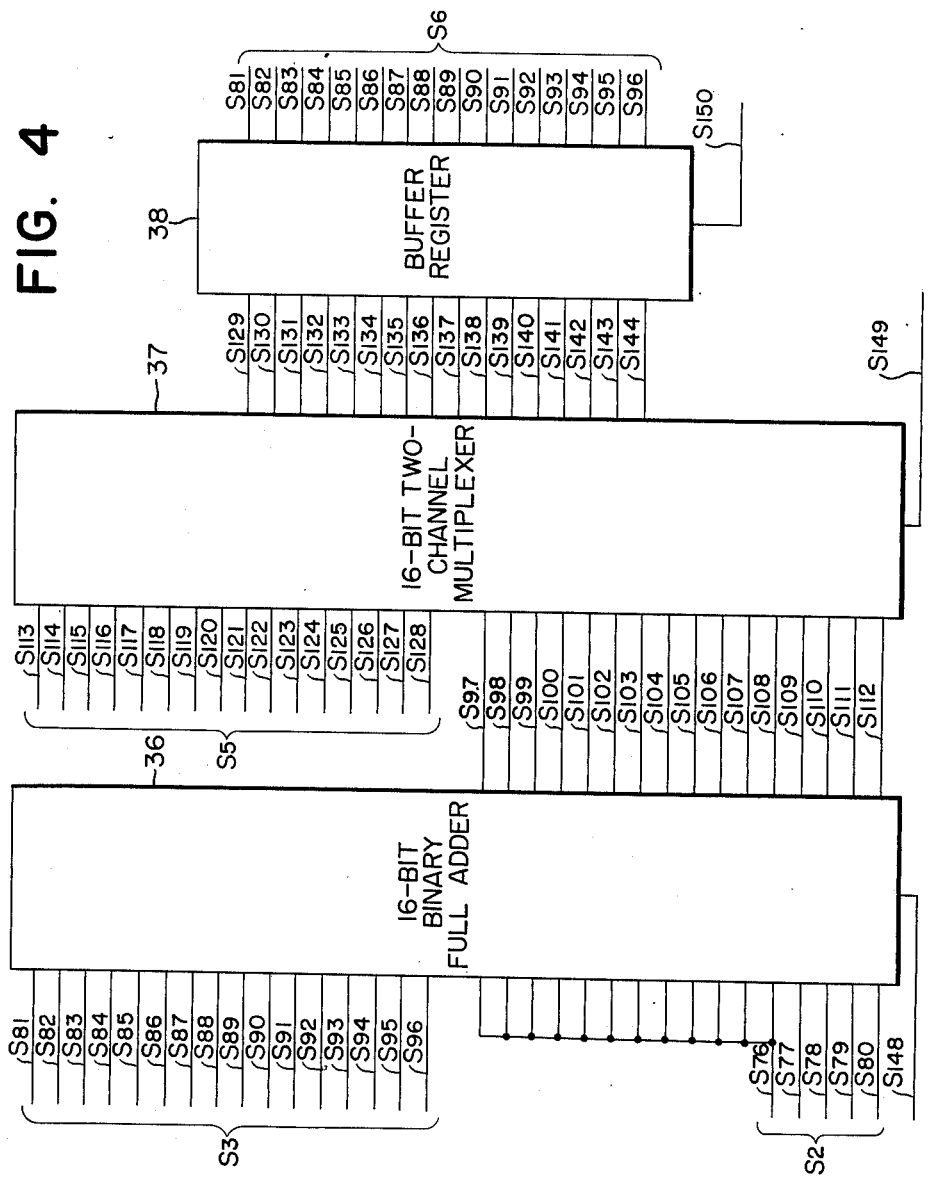

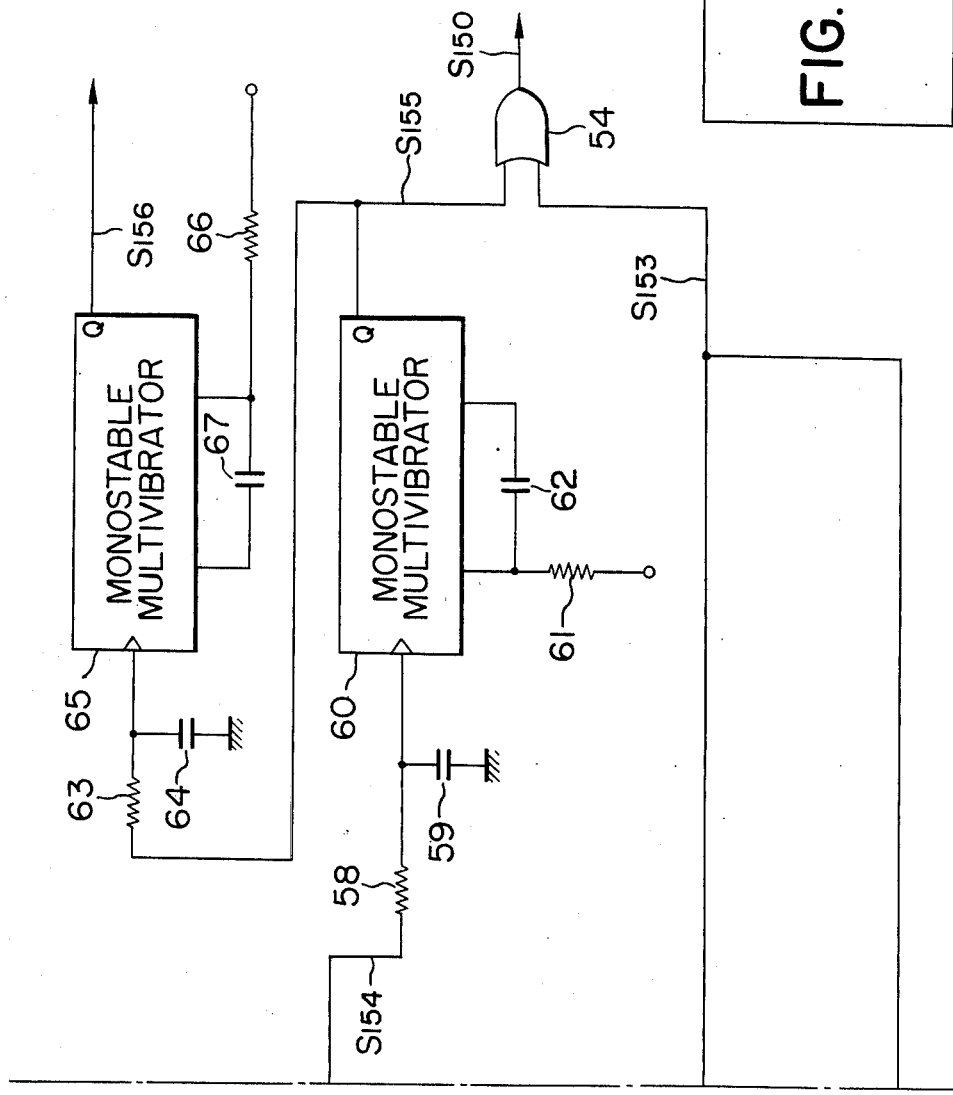

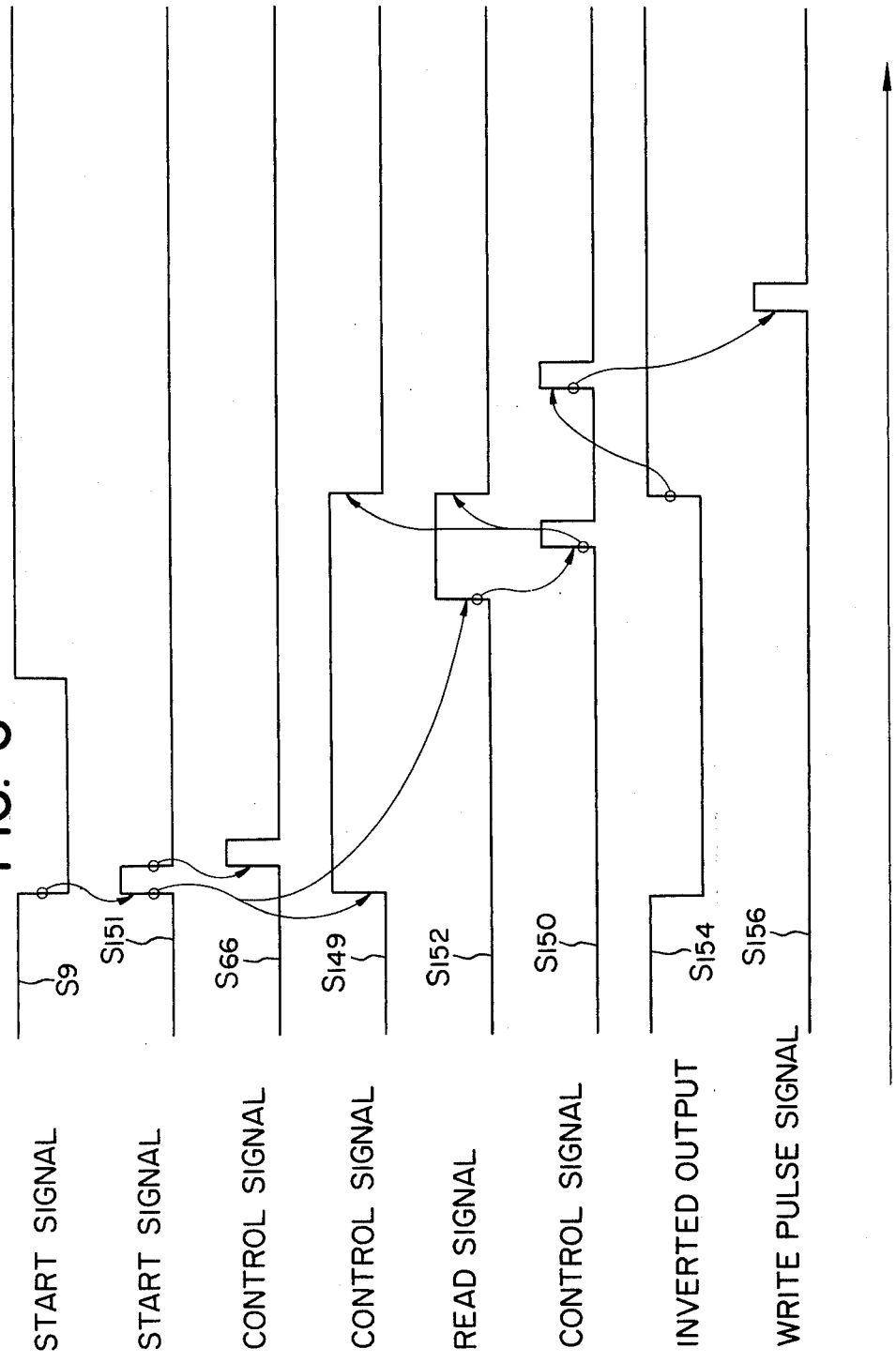

SIGNAL MODIFICATION DEVICE FOR MEMORY CONTROLLED MANIPULATOR APPARATUS

BACKGROUND OF THE INVENTION

The present invention relates to generally a memory controlled manipulator apparatus capable of repetitively performing reproducible operations, and more particularly to a digital position instruction or command signal modification device for use with a memory controlled manipulator apparatus, which may modify some or all of the digital position instruction or command signals stored in a memory without repeating the manual teaching operation, merely by setting or entering desired modifying values.

In order to enable a manipulator device to perform a desired series of programmed operations in succession during the repetitive working cycles, the manipulator is manually and sequentially displaced during the teaching operation from one desired position to another according to the desired series of operations to be performed, so that digital position signals representing the desired positions of the manipulator may be stored in a memory. Instruction signals for peripheral equipment for enabling various operations to be performed in cooperation or synchronism with the manipulator are simultaneously in the memory with operation instruction signals such as the driving speed instruction signals for the manipulator. In repetitive working cycles, the digital position signals and other various instruction signals stored in the memory are sequentially read out so that the manipulator may perform the desired series of operations. In the operation of manipulator apparatus of the above type, it is necessary to modify some or all of the digital position instruction signals stored in the memory when the actual position of the manipulator deviates from a programmed position or when the position of the manipulator with respect to an article to be handled by the manipulator is changed. For this purpose, the new teaching operation must be performed in the conventional manipulator apparatus, resulting in the considerable loss in time.

SUMMARY OF THE INVENTION

In view of the above, one of the objects of the present invention is to provide an improved programmed manipulator apparatus which overcomes the above and other defects and problems encountered in the conventional manipulator apparatus.

Another object of the invention is to provide an improved programmed manipulator apparatus in which the digital position instruction signals may be modified by a simple operation without repeating or performing a new teaching operation.

Briefly stated, the present invention may be practiced using a memory-repeated reproducible operating manipulator apparatus of the type in which the digital signals produced when the manipulator is sequentially displaced from one desired position to another during the manual teaching operation to perform a desired series of operations are stored in a memory as the digital position instruction signals which are used to cause the manipulator to perform or reproduce the desired series of operations in succession in the repetitive working cycles. According to the present invention, it is not required to perform a new teaching operation when some or all of the digital position instruction signals stored are to be modified. The modification of the desired digital position instruction signals stored may be effected only by entering or setting a modifying value and the address in the memory of a digital position instruction signal to be modified.

BRIEF DESCRIPTION OF THE DRAWING

FIG. 4 is a detailed block diagram of an adder and a digital position instruction signal buffer storage for the device shown in FIG. 1;

FIG. 6 is a timing chart used for the explanation of the mode of operation of the control unit shown in FIG. 5.

DESCRIPTION OF THE PREFERRED EMBODIMENT

Figure 1:
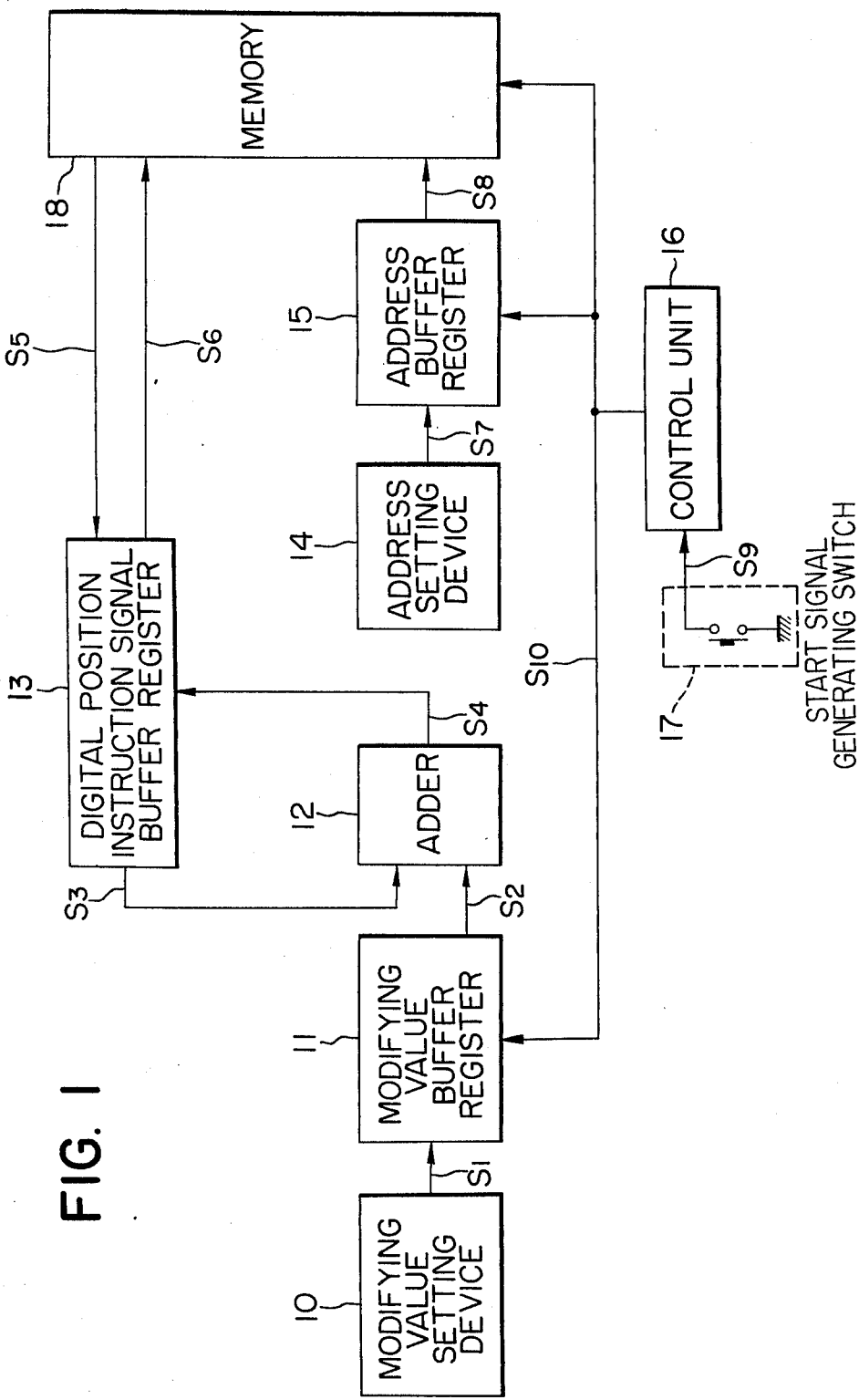
FIG. 1 is a block diagram of an instruction modification device used for the explanation of the underlying principle of the present invention.

Referring first to FIG. 1, therein is shown a digital position instruction modification device D comprising a modifying value setting device 10, a modifying value buffer register 11, and adder 12, a digital position instruction signal buffer register 13, an address setting device, and address buffer register 15, a control unit 16, a start signal generating switch 17, and a memory 18 in which are stored digital position instructions generated during the teaching operation of a manipulator apparatus. In response to the start signal $S_9$ from the switch 17, the control unit 16 is actuated to apply the control signal $S_{10}$ to the buffer register 15 so that the address signal $S_7$ set by the address setting device 15 is transferred into the address buffer register 15. The digital position instruction $S_5$ stored at the address designated by the address signal $S_8$ from the address buffer register 15 is thereby read out from the memory 18 and transferred to the digital position instruction buffer register 13. Also in response to the control signal $S_{10}$ from the control unit 16, the modifying value signal $S_1$ set by the modifying value setting device 10 is transferred to the modifying value buffer register 11. The modifying value signal $S_2$ from the buffer register 11 and the digital position instruction signal $S_3$ from the buffer register 13 are added in the adder 12, and the output (modified position signal) $S_4$ from the adder 12 is stored in the digital position instruction buffer register 13. The modified digital positioning (position) instruction signal $S_6$ from the buffer register 13 is stored at the address in the memory 18 designated by the address signal $S_8$ from the address signal buffer register 15. (As will be apparent in the following description, the control signal $S_{10}$ is actually comprised of a series of separate control signals.)

Thus the digital position instructions may be easily modified within a short time without performing a new teaching operation in the manipulator apparatus by setting by the address setting device 14 an address of a digital position instruction to be modified, setting by the modifying value setting device 10 a modifying value, and repeating the above two steps.

Next referring to FIGS. 2–6, the construction of the structural components of the digital position instruction modification device D will now be described in detail.

Figure 2:
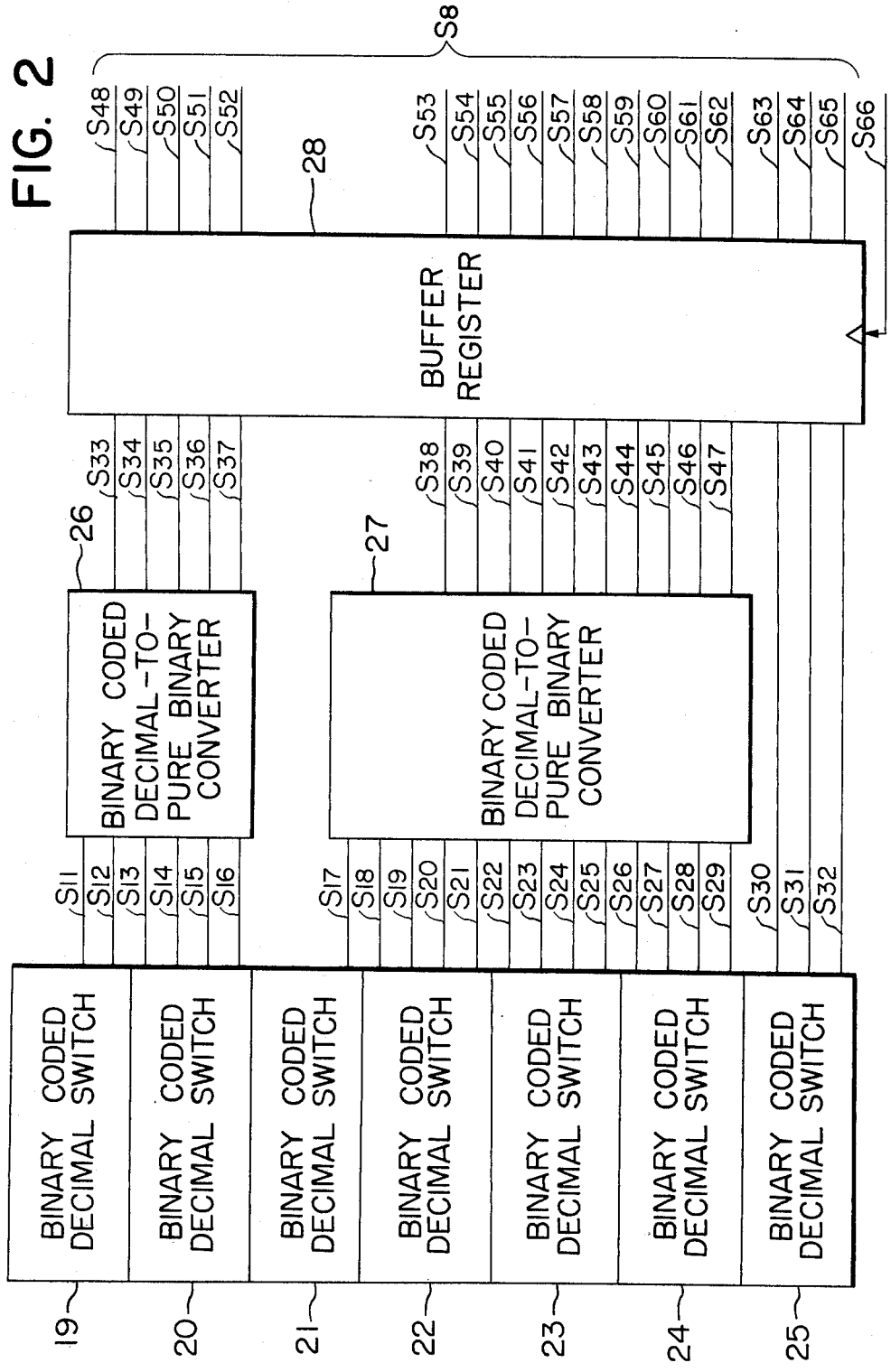
FIG. 2 is a detailed block diagram of an address setting device and an address buffer storage for the device shown in FIG. 1.

Referring to FIG. 2 illustrating in block diagram form the address setting device 14 and the address signal buffer register 15, a two-digit decimal number selected from the range between 00 and 31 is entered by two binary coded decimal switches 19 and 20, and the binary coded decimal signals $S_{11}$ through $S_{16}$ representing the entered decimal number are applied to a binary coded decimal-to-pure binary converter 26 to be converted into the pure binary signals $S_{33}$ through $S_{37}$. In like manner, the binary coded decimal signals $S_{17}$ through $S_{29}$ representing a four-digit decimal number selected from the range between 0000 and 1023 entered by four digital switches 21 through 24 are applied to a binary coded decimal-to-pure binary converter 27 to be converted into the pure binary signals $S_{38}$ through $S_{47}$. The pure binary signals $S_{30}$ through $S_{32}$ representing a decimal number selected from the range between 0 and 7 and entered by a digital switch 25, and the pure binary signals $S_{33}$ through $S_{37}$ and $S_{38}$ through $S_{47}$ are transferred in response to the change of the control signal $S_{66}$ from 0 to 1 to a buffer register 28 consisting of 18 direct-coupled flip-flops. The pure binary output signals $S_{48}$ through $S_{65}$ from the buffer register 28 make up the address signal $S_8$ shown in FIG. 1.

Figure 3:
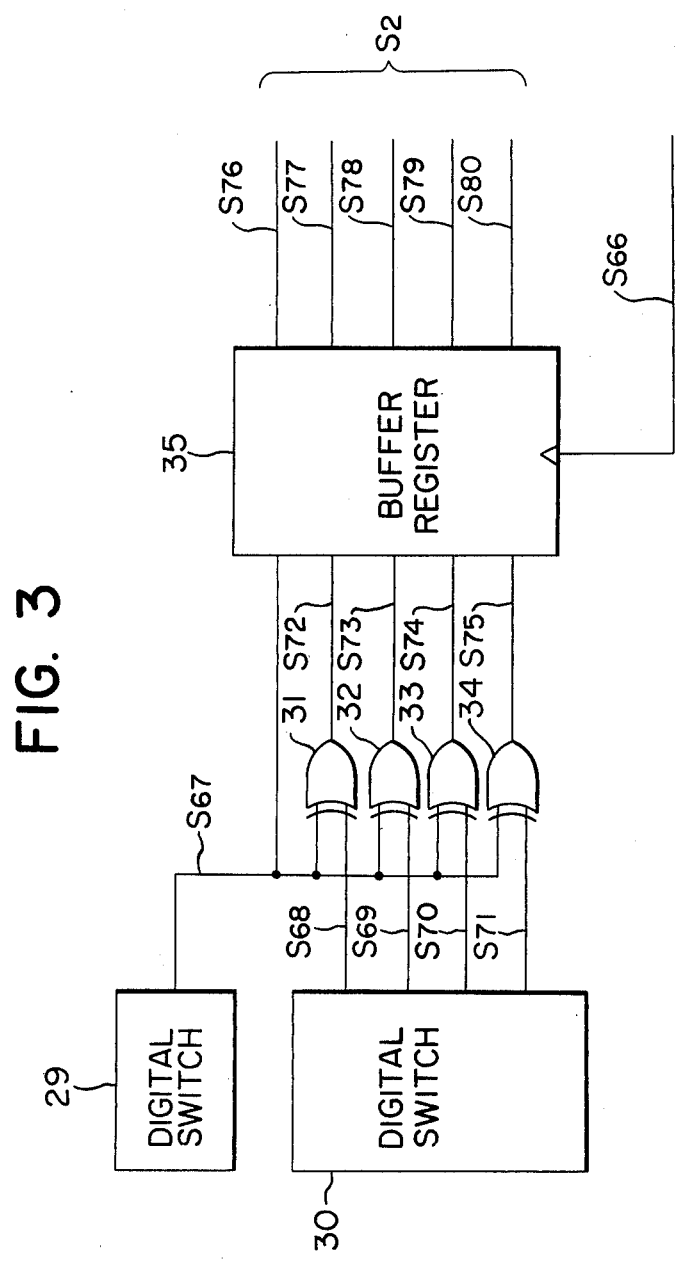
FIG. 3 is a detailed block diagram of a modifier setting device and a modifier buffer storage for the device shown in FIG. 1.

Next referring to FIG. 3, the modifying value setting device 10 and its buffer register 11 will be described. The pure binary signals $S_{68}$ through $S_{71}$ representing a decimal number 0, 1, 2, 3, 4, 5, 6, 7, 8, or 9 entered by a digital switch 30 are applied to EXCLUSIVE OR gates 31 through 34, respectively. The polarity signal $S_{67}$ entered by a digital switch 29 is 0 or 1 depending upon whether the decimal number entered by the digital switch 30 is positive or negative, respectively, and is applied also to the EXCLUSIVE OR gates 31 through 34. In response to the change of the control signal $S_{66}$ from 0 to 1, the polarity signal $S_{67}$ and the output signals $S_{72}$ through $S_{75}$ from the EXCLUSIVE OR gates 31 through 34 are transferred into a buffer register 35 consisting of five direct-coupled flip-flops. The pure binary signals $S_{76}$ through $S_{80}$ representing the decimal number with its sign + or − make up the modifying value signal $S_2$ shown in FIG. 1.

It should be noted that, when the output $S_2$ represents a negative number, due to the presence of a 1 signal $S_{67}$ from the digital switch 29, the outputs $S_{72}$–$S_{75}$ of the EXCLUSIVE OR gates 31–34 will be the 1's complement of the pure binary signals $S_{68}$–$S_{71}$ applied from the digital switch 30 to the EXCLUSIVE OR gates 31–34.

FIG. 4 shows the adder 12 and the digital position instruction buffer register 13. The digital position instruction signals $S_{113}$ through $S_{128}$ forming the signal $S_5$ read out from the address designated by the address signal $S_8$ in the memory 18 are transferred into a 16-bit two-channel multiplexer 37. When the control signal $S_{149}$ applied from the control unit 16 to the multiplexer 37 is 1, the channel in which the digital position instruction signals $S_{113}$ through $S_{128}$ are stored is selected, so that the output signals $S_{129}$ through $S_{144}$ are transferred into a buffer register 38 consisting of 16 direct-coupled flip-flops, in response to the change from 0 to 1 of the control signal $S_{150}$ applied to the buffer register 38 from the control unit 16. The output signals $S_{81}$ through $S_{96}$ from the buffer register 38 are applied to a 16-bit binary full adder 36 so as to be added to the pure binary signals $S_{76}$ through $S_{80}$ from the buffer register 35 (See FIG. 3).

When a positive modification is to be made, i.e., when the modifying value is positive, as discussed above, the signal $S_{76}$, corresponding to the polarity, is 0, and the signals $S_{77}$–$S_{80}$ are a pure binary signal corresponding to the decimal digit to be added. When the number is to be subtracted, i.e., when the modifying value is negative, as discussed above, the signal $S_{76}$ is 1, and the signals $S_{77}$–$S_{80}$ correspond to the 1's complement of the pure binary signal representing the decimal digit. Thus, in accordance with known arithmetic techniques, when the modifying value is negative, the 1's complement signal $S_{77}$–$S_{80}$ is added to the quantity to be modified in the full adder 36, and the 1 signal $S_{76}$ is added to the least significant digit in the full adder 36 as an end around carry signal, so that the desired subtraction is effected by adding. The principle of this technique of subtraction is well known.

In the system of FIG. 4, the signal $S_{76}$ is applied to the least significant digit of adder 36 as the carry input signal $S_{148}$.

The output signals $S_{97}$ through $S_{112}$ from the adder 36 are transferred into the other channel of the multiplexer 37, are thence applied to the buffer register 38 when the control signal $S_{149}$ is 0, and are stored in the buffer register 38 in response to the change from 0 to 1 of the control signal $S_{150}$ applied to the buffer register 38 as the modified digital position instruction signals.

Next referring to FIGS. 5 and 6, the control unit 16 will be described. When a switch 17 is closed, the signal $S_9$ changes from 1 to 0 so that a monostable multivibrator 39 is triggered to generate the shot pulse start signal $S_{151}$ whose pulse duration is dependent upon the time constant which in turn is dependent upon the values of a resistor 40 and a capacitor 41. The start signal $S_{151}$ sets an R-S flip-flop 42 so that the control signal $S_{149}$ at the output thereof changes to 1. The control signal $S_{149}$ is applied to the multiplexer 37 (See FIG. 4) and to the memory 18 (See FIG. 1) so that the latter is driven into the read mode. When the start signal $S_{151}$ changes from 1 to 0, a monostable multivibrator 43 is triggered to generate the control signal $S_{66}$ (see FIGS. 2 and 3) whose pulse duration is dependent upon a time constant of a circuit consisting of a resistor 44 and a capacitor 45. The start signal $S_{151}$ is also applied to an R-S flip-flop 48 by way of a series resistor 46 and shunt capacitor 47, so that the triggering of the R-S flip-flop by the signal $S_{151}$ is delayed by a time corresponding to the time constant which is determined by the values of resistor 46 and capacitor 47. Upon being triggered, the R-S flip-flop 48 generates the read signal $S_{152}$ to be applied to the memory 18.

The read signal $S_{152}$ is applied to monostable multivibrator 51 by way of series resistor 49 and shunt capacitor 50, so that the triggering of the monostable multivibrator 51 by the signal $S_{152}$ is delayed by a time corresponding to the time constant determined by the values of resistor 49 and capacitor 50. Upon being triggered, the monostable multivibrator 51 generates a shot pulse signal $S_{153}$ whose pulse duration is dependent upon the time constant of a circuit consisting of a resistor 52 and a capacitor 53. The shot pulse signal $S_{153}$ is applied as one input of an OR gate 54, whose output $S_{150}$ is applied as the control signal to the buffer register 38 (See FIG. 4).

The shot pulse signal $S_{153}$ which is applied by way of a time constant circuit consisting of a series resistor 55 and a shunt capacitor 56 to the reset terminals of the R-S flip-flops 42 and 48 so that their output signals $S_{149}$ and $S_{152}$ are changed from 1 to 0 after a delay time corresponding to the time constant of resistor 55 and capacitor 56.

The signal $S_{149}$ passes through an inverter 57 to become the inverted signal $S_{154}$. The signal $S_{154}$ is applied by way of a time constant circuit consisting of a series resistor 58 and a shunt capacitor 59 to a monostable multivibrator 60 so that following a delay determined by the resistor 58 and capacitor 59, the multivibrator 60 generates a shot pulse output signal $S_{155}$ whose pulse duration is dependent upon the time constant of a circuit consisting of a resistor 61 and a capacitor 62. The output pulse signal $S_{155}$ is applied as a second input to the OR gate 54, the output of which is applied as the control signal $S_{150}$ to the buffer register 38 as above discussed.

The output pulse signal $S_{155}$ is applied by way of the time constant circuit consisting of a series resistor 63 and a shunt capacitor 64 to a monostable multivibrator 65 to trigger the multivibrator 65 after a delay corresponding to the time constant of resistor 63 and capacitor 64. The multivibrator 65 in turn generates the write pulse signal $S_{156}$ having pulse duration dependent upon the time constant of a circuit consisting of a resistor 66 and a capacitor 67. The signal $S_{156}$ is applied to the memory 18.

Figure 5A:
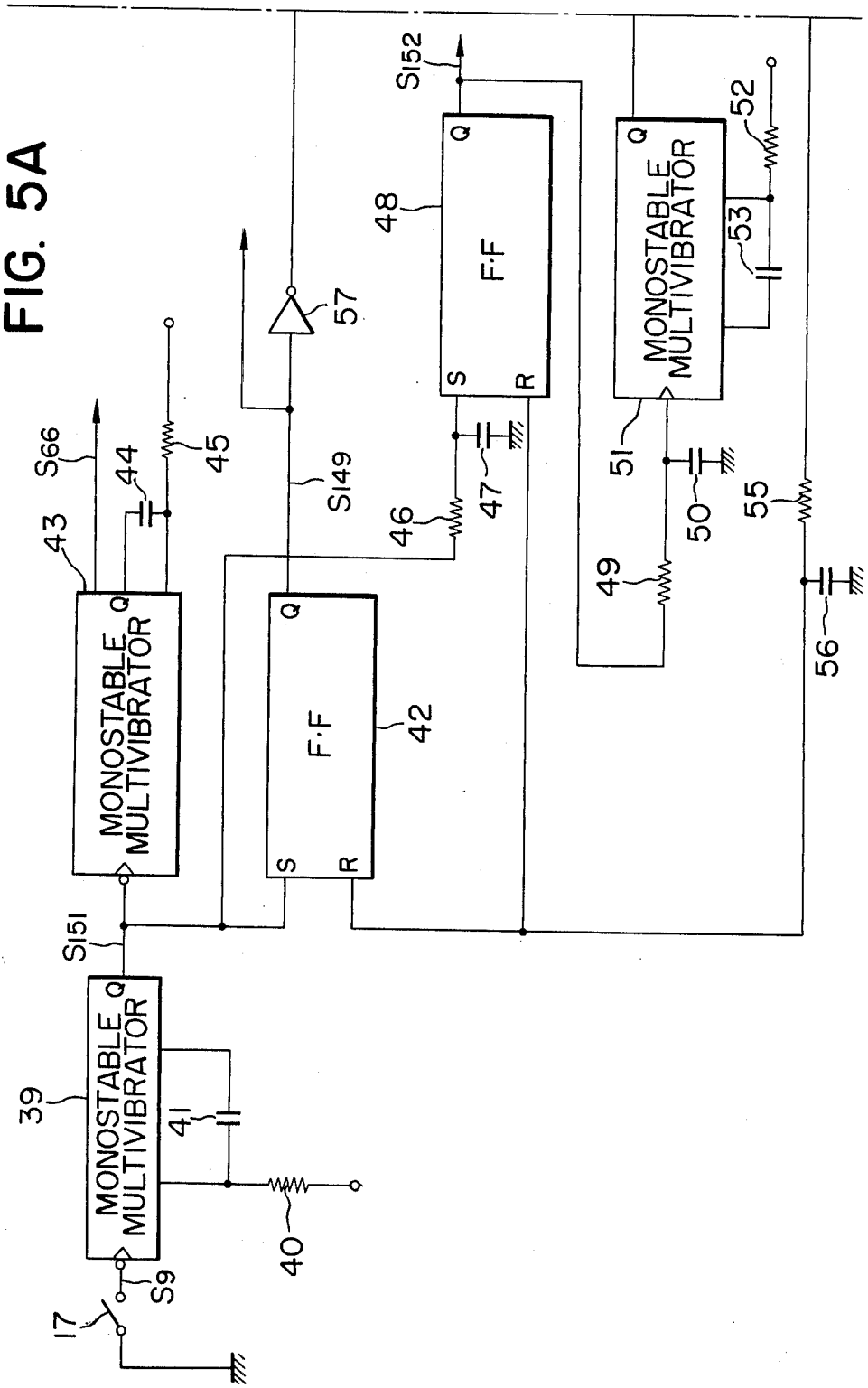
FIG. 5 is a detailed block diagram of a control unit for the device shown in FIG. 1.

In the sequence of operation of the system of FIG. 1, under the control of the signals illustrated in FIG. 6, generated by the control circuit of FIG. 5, in the first step the control signal $S_{149}$ is applied to the memory 18, to set the memory in the read mode. This signal also sets the multiplexer 37 so that its output corresponds to the first channel, i.e., the signals $S_{113}$–$S_{128}$. Then the control signal $S_{66}$ effects the storage in the address buffer register 15 of the address set in the setting device 14, so that the address of the data to be modified is applied to the memory 18. The signal $S_{66}$ also effects the storage in the buffer register 11 of the modifying value set in the setting device 10, so that the modifying signal is applied to the adder 12. Then, the read signal $S_{152}$ reads out the address data of the memory 18 for application to the first channel of the multiplexer 37, and since at this time the multiplexer 37 under control of the signal 149 is still switched to the first channel, the following first pulse of the control signal $S_{150}$ effects the storage in the buffer register 38 of the data previously stored in the memory 18. This data is applied to the adder 36.

The signals $S_{149}$ and $S_{152}$ are then released, to remove the memory from the read mode, and to switch the multiplexer 37 to the second channel. Then, the second pulse of the control signal 150 effects the storage in the buffer register 38 of the data applied to the second channel of multiplexer 37, i.e., the data modified in the adder 36. Since the output of the buffer register 38 is also applied to the memory 18, the subsequent write pulse signal 156 applied to the memory 18 effects the writing in the memory of the modified data, at the selected address.

Figure 7:
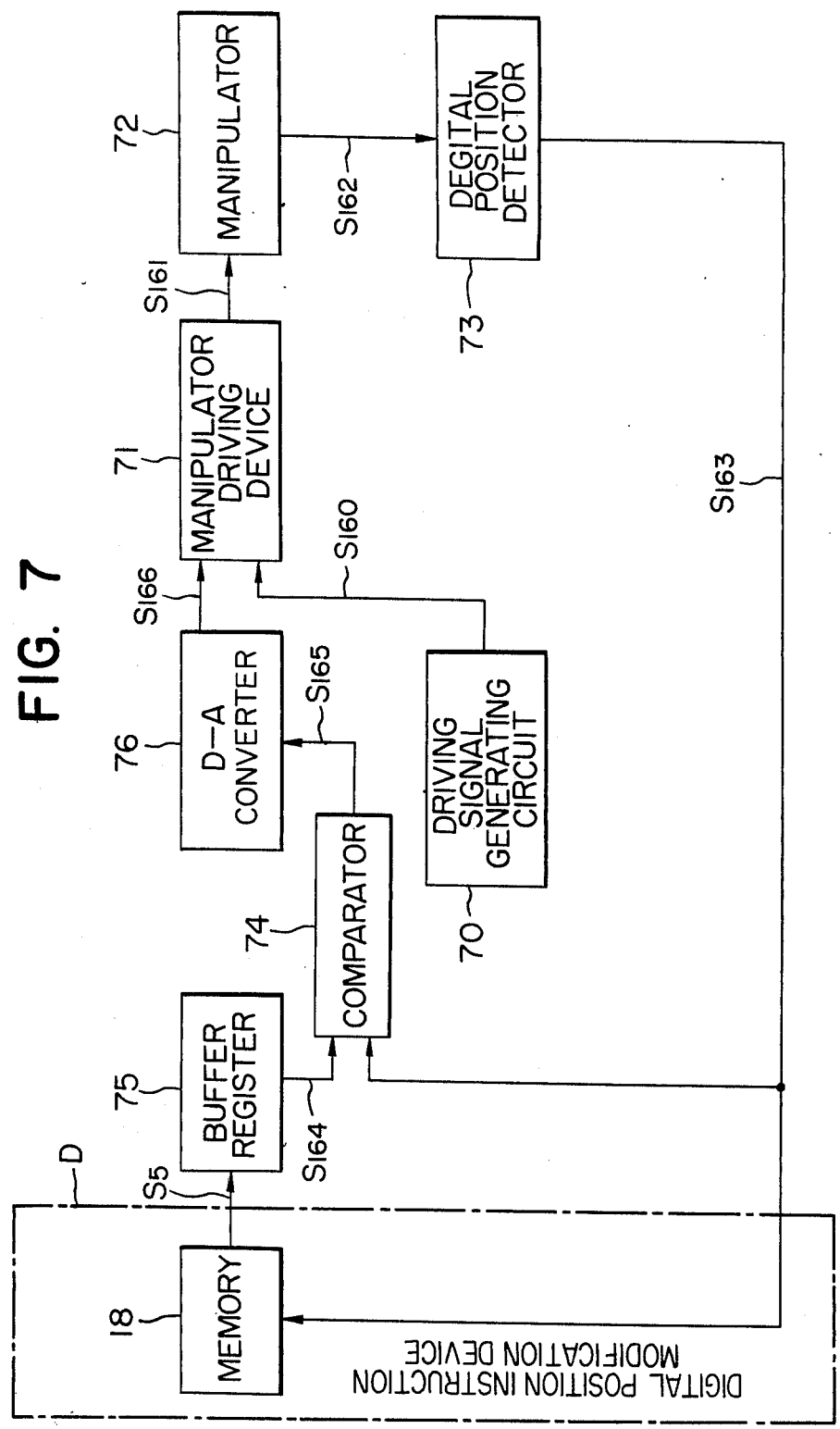
FIG. 7 is a block diagram of one preferred embodiment of a programmed manipulator apparatus in accordance with the present invention, incorporating the instruction modification device shown in FIG. 1.

FIG. 7 illustrates a manipulator apparatus in accordance with a preferred embodiment of the invention, incorporating means for modifying the digital position instructions. In this figure, the block D represents the digital position instruction modifying device illustrated in FIG. 1, incorporating the memory 18.

Referring to FIG. 7, a driving signal generating circuit 70 is provided for producing a control signal $S_{160}$, for driving a manipulator 72 during a manual teaching operation. The driving signal $S_{160}$ is an analog signal, and is applied to a manipulator driving device 71, which produces an output signal 161 in response to input signals applied thereto, for driving the manipulator 72. The manipulator 72 may, for example, be a mechanical arm adapted to position objects in a desired manner. A digital position detector 73 is mechanically coupled to the manipulator 72, for example by means of the coupling $S_{162}$, whereby the detector 73 provides an output digital signal $S_{163}$ corresponding to the position of the manipulator 72. This signal is applied to the memory 18 in the digital position instruction modification device D, and is stored therein as a digital position instruction signal. Thus, in a manual teaching operation, the manipulator 72 may be controlled to perform a desired sequence of movements, in response to the control thereof by the signal $S_{160}$ from the signal generating circuit 70. The signal generating circuit 70 may be manually controlled. The addressing of the memory with respect to given instruction signals may be effected in any conventional manner, so that the programmed steps for the movements of the manipulator are readily accessible in the memory 18.

In the motion reproduction mode or repetitive working cycles of the manipulator, the digital position signals $S_{163}$ are no longer applied to the memory 18, being applied instead to the comparator 74. In this position, the digital position instruction signal S5 corresponding to the movement of the manipulator 72 to be made is read out of the memory 18, and stored in a buffer register 75. The output signal $S_{164}$ from the buffer register 75 is compared in the comparator 74 with the digital position signal $S_{163}$. The output, or differential signal $S_{165}$ from the comparator 74 is applied to a digital to analog converter 76, for conversion to an analog differential signal $S_{166}$. The signal $S_{166}$ is applied to the manipulator driving device 71 which, in the motion reproduction mode, is not controlled by the driving signal $S_{160}$.

In response to the output signal $S_{161}$ from the driving device 71, the manipulator 72 is moved in such a direction as to minimize the differential signal $S_{165}$. When the differential signal $S_{165}$ becomes zero, the output signal $S_{161}$ disappears, and the manipulator 72 hence stops.

If the positions of the manipulator device from programmed positions, or if it is desired to change the position of the manipulator at any given step, in accordance with the present invention, referring to FIG. 1, the address of the instruction corresponding to the position to be changed is set into the address setting device 14, and the modifying value for the given step is set in the modifying value setting device 10. In other words, referring to FIG. 3, digital switch 30 may be manually set to a value corresponding to the desired degree of modification and digital switch 29 may be manually set to provide a 0 or 1 output, dependent upon where the modifying value is to be added or subtracted respectively from the stored signal.

Following the setting of the digital switches 29 and 30 and the address setting device 14, the start signal switch 17 is depressed, to effect the modification of the program at the determined address, as above described.

While, as above described, a single buffer register 38 may be employed in combination with the 16 bit two channel multiplexer 37, it will be apparent that two separate buffer registers may be employed in place of the single buffer register 38. In such an arrangement, the multiplexer 37 may be omitted, with the first of the substituted buffer registers being connected to directly receive the data from the memory 18, and the second of the buffer registers being connected to directly receive the modified data from adder 36. The output of the first substituted buffer register is connected to the adder 36, but not connected to the memory 18, and the output of the second substituted buffer register is connected to the memory 18. In such an arrangement, the control signals applied to the substituted buffer registers may be suitably modified, for example, by applying the first pulse of the control signal $S_{160}$ to the first buffer register, and by applying the second control pulse of the signal $S_{150}$ to the second buffer register. The control signal $S_{150}$ may be modified for the above purpose by conventional means. While the invention has been disclosed and described with reference to a limited number of embodiments, it will be apparent that variations and modifications may be made therein, and it is intended in the following claims to cover each such variation and modification as falls within the true spirit and scope of the invention.

What is claimed is:

1. A digital position instruction signal modification device for a memory controlled teachable manipulator apparatus of the type comprising
    i. manipulator means for performing a predetermined series of operations in succession at predetermined positions during the operating made thereof,
    ii. means including a manipulator position detector for generating a digital position signal representing the actual position of said manipulator apparatus,
    iii. memory means for storing therein a plurality of digital position signals generated by said digital position signal generating means during the teaching mode of said manipulator apparatus as the digital position instruction signals to be used for causing said manipulator means to perform said predetermined series of operations, each of said position instruction signals being stored at a corresponding predetermined address within said memory means,
    iv. comparator means for comparing the output signal from said memory means with the output signal from said digital position signal generating means in a motion reproduction mode of said manipulator apparatus to produce an output error signal proportional to the difference between said two output signals, and
    v. manipulator apparatus driving means for driving said manipulator means in such a direction as to make said output error signal zero, thereby causing the position of said manipulator apparatus to correspond with the corresponding instruction signal, characterized in that said digital position instruction signal modification device comprises
    a. a modifying value setting means coupled to said manipulator position detector for setting a modifying value for modifying a desired digital position signal stored in said memory means,
    b. first buffer register means for storing therein said modifying value from said modifying value setting means,
    c. address setting means for setting the address in said memory means of the digital position instruction signal to be modified,
    d. second buffer register means for storing therein the output from said address setting means,
    e. third buffer register means for storing therein the digital position instruction signal read out from said memory means in response to the output signal from said address setting means,
    f. adder means for adding the modifying value from said first buffer register means to the digital position signal from said third buffer register means, thereby modifying said digital position signal,
    g. fourth buffer register means for storing therein the modified position signal and transferring the same to said memory means, and
    h. manually operable control means operative at times other than during said operating and teaching modes of said manipulator apparatus for controlling the storage of signals in said first, second, third and fourth buffer register means and for controlling the position of said manipulator apparatus at such times.

2. The system of claim 1 wherein said adder comprises a binary full adder, and an output of said first buffer register is connected as an input of said binary full adder.

3. The system of claim 1 further comprising a two channel multiplexer having first and second channels selectively coupled to a common output in response to signals applied to a control terminal, said common output being applied to said fourth buffer register, said means reading out said memory means comprising means applying the output of said memory means to said first channel and said means for applying the output of said adding means to said fourth register means comprising means applying the output of said adding means to said second channel.

4. The system of claim 3 wherein said control means generates first, second and third and fourth sequentially occurring control signals, further comprising means for applying said first and fourth signals to said memory means as read and write signals respectively, means for applying said second and third signals to said fourth buffer register to effect the storage therein of signals applied thereto, and generated by said control means a fifth signal for connecting said first channel to said fourth buffer register during said second signal, and for connecting said second channel to said fourth buffer register during said third signal.

* * * * *

UNITED STATES PATENT OFFICE
CERTIFICATE OF CORRECTION

Patent No. 4,025,838          Dated May 24, 1977

Inventor(s) Takehiko Watanabe

It is certified that error appears in the above-identified patent and that said Letters Patent are hereby corrected as shown below:

Column 2, line 36: "and" should be --an--; after "device" insert --14--.

Column 2, line 43: "address setting device 15" should be --address setting device 14--.

Column 6, line 51: "device" should be --deviate--.

Column 7, line 34: "made" should be --mode--.

In Figure 7: "DEGITAL POSITION DETECTOR" should be --DIGITAL POSITION DETECTOR--.

Signed and Sealed this

Twenty-fourth Day of January 1978

[SEAL]

Attest:

RUTH C. MASON
Attesting Officer

LUTRELLE F. PARKER
Acting Commissioner of Patents and Trademark